United States Patent [19]

Yoshida et al.

[11] 4,441,061
[45] Apr. 3, 1984

[54] MOTOR SPEED CONTROL SYSTEM

[75] Inventors: Noriyuki Yoshida; Yoshimi Asai, both of Nagoya, Japan

[73] Assignee: Brother Kogyo Kabushiki Kaisha, Nagoya, Japan

[21] Appl. No.: 394,431

[22] Filed: Jul. 1, 1982

[30] Foreign Application Priority Data

Jul. 18, 1981 [JP] Japan .................................. 56-112562

[51] Int. Cl.$^3$ .............................................. G05B 5/00
[52] U.S. Cl. ..................................... 318/329; 318/341; 318/601
[58] Field of Search ............... 318/601, 603, 604, 326, 318/327, 310, 311, 312, 341, 318, 314, 329

[56] References Cited

U.S. PATENT DOCUMENTS

| 3,333,089 | 7/1967 | Saylor et al. | 318/601 |
| 3,795,851 | 3/1974 | Gage et al. | 318/604 X |
| 3,932,794 | 1/1976 | Iwako | 318/327 X |
| 4,201,936 | 5/1980 | Roumanis | 318/341 |
| 4,311,949 | 1/1982 | Pelkmann et al. | 318/318 X |

Primary Examiner—Ulysses Weldon
Attorney, Agent, or Firm—Browdy & Neimark

[57] ABSTRACT

A motor speed control system comprising a digital control circuit for working out and storing digital control signals in response to digital speed detection signals representing detected actual motor speeds and to digital speed command signals representing commanded nominal motor speeds, and further comprising an analog control circuit for controlling power supply to the motor in accordance with analog control signals corresponding to the digital control signals and with analog speed detection signals representing the detected actual motor speed. The digital control circuit receives the digital speed detection and command signals and produces, in a predetermined cycle, the digital control signal which is prepared based on a difference between the detected actual speed and the commanded speed of the motor, without being affected by ambient conditions of the system and drifts of control elements of the circuit during service. The analog control circuit regulates the power supply to the motor in quick response to the difference or deviation of the actual motor speed from the desired nominal speed during the predetermined cycle. The digital and analog control circuits cooperate to control the running speed of the motor with high levels of accuracy and response capability.

2 Claims, 3 Drawing Figures

MOTOR SPEED CONTROL SYSTEM

BACKGROUND OF THE INVENTION

The present invention relates generally to motor speed control systems and more particularly to such systems having high levels of response capability and control accuracy.

There have been proposed and available in the art various motor speed control systems wherein a prescribed or commanded speed of the motor is compared with a detected actual speed thereof and the power supply to the motor is controlled such that a difference between the actual and commanded speeds becomes zero.

Such motor speed control systems are characterized in that the power to be supplied to the motor is regulated, in response to variations in load applied to the motor, by means of feeding back the detected actual speed of rotation of the motor so as to maintain or stabilize the motor at a commanded nominal or desired speed. However, those systems in the art suffer potential problems or disadvantages as described below.

When such control systems consists of an analog circuit, for example, the individual systems require different adjustments appropriate for compensating for their variations in motor torque load, motor speed detector, specific circuit constants, etc. Another problem of the prior analog systems for speed control applications is that the controlled speed of the motor is affected by ambient conditions such as temperature and humidity, and subject to drifts of the circuit elements during service.

On the other hand, when the speed control system consists of a digital circuit, it is free from the above problem, but the system is limited in speed detecting time (sampling time) determined by a resolution of a detector used to detect the speed of rotation of the motor, and also limited in time necessary for processing associated digital signals. Therefore, such digital control system has a considerable difficulty in the speed control at a higher-than-audio frequency even when the controlling cycle time including the above times is reduced to its shortest possible length, whereby the prior digital control system is considered to have lower response capability than the analog control system.

SUMMARY OF THE INVENTION

The present invention was made in view of the above background. Accordingly, it is an object of the invention to provide a motor speed control system which requires no post-assembly adjustments for consistent control characteristics, provides consistent and stable control characteristics without being affected by ambient conditions and drifts of circuit elements during their service, and has a high standard of response capability.

To attain the above object, a speed control system according to the present invention comprises a digital control circuit in which the actual speed of the motor is detected in a predetermined cycle and a corresponding digital speed detection signal is generated. This digital signal representative of the detected actual motor speed and a digital speed command signal representative of a commanded nominal motor speed are processed within the digital control circuit to produce a digital control signal associated with a difference between the actual and commanded speeds. The control signal is held in a latch of the digital control circuit for a predetermined time interval and converted by a converter into a corresponding analog control signal which is then applied to an analog control circuit. The analog control circuit which constantly receives an analog speed detection signal representing the actual motor speed, controls the conduction of a semiconductor control element in accordance with the analog control and detection signals. The power supply to the motor is achieved through the semiconductor element whereby the actual running speed of the motor is controlled with high levels of accuracy and response so as to coincide with the commanded speed.

As indicated above, a speed control system according to this invention is characterized in that the detection of an actual motor speed and the calculation of a difference between the actual and commanded speeds are conducted by a digital control circuit which, by nature, requires no cumbersome adjustments of the system after its assembling, and is completely free from the problem of low control accuracy due to unfavourable variations in the running speed of the motor during its service. In addition, the present speed control system offers an extremely high response capability, that is, the electric power supply to the motor is quickly adapted by means of an analog control circuit to varying loads applied to the motor, irrespective of the periods of time spent by the digital control circuit for detecting the actual motor speed and for processing the digital signals.

DETAILED DESCRIPTION OF THE PREFERRED EMBODIMENTS

There will be described in detail the present invention with reference to the drawings.

Figure 1:
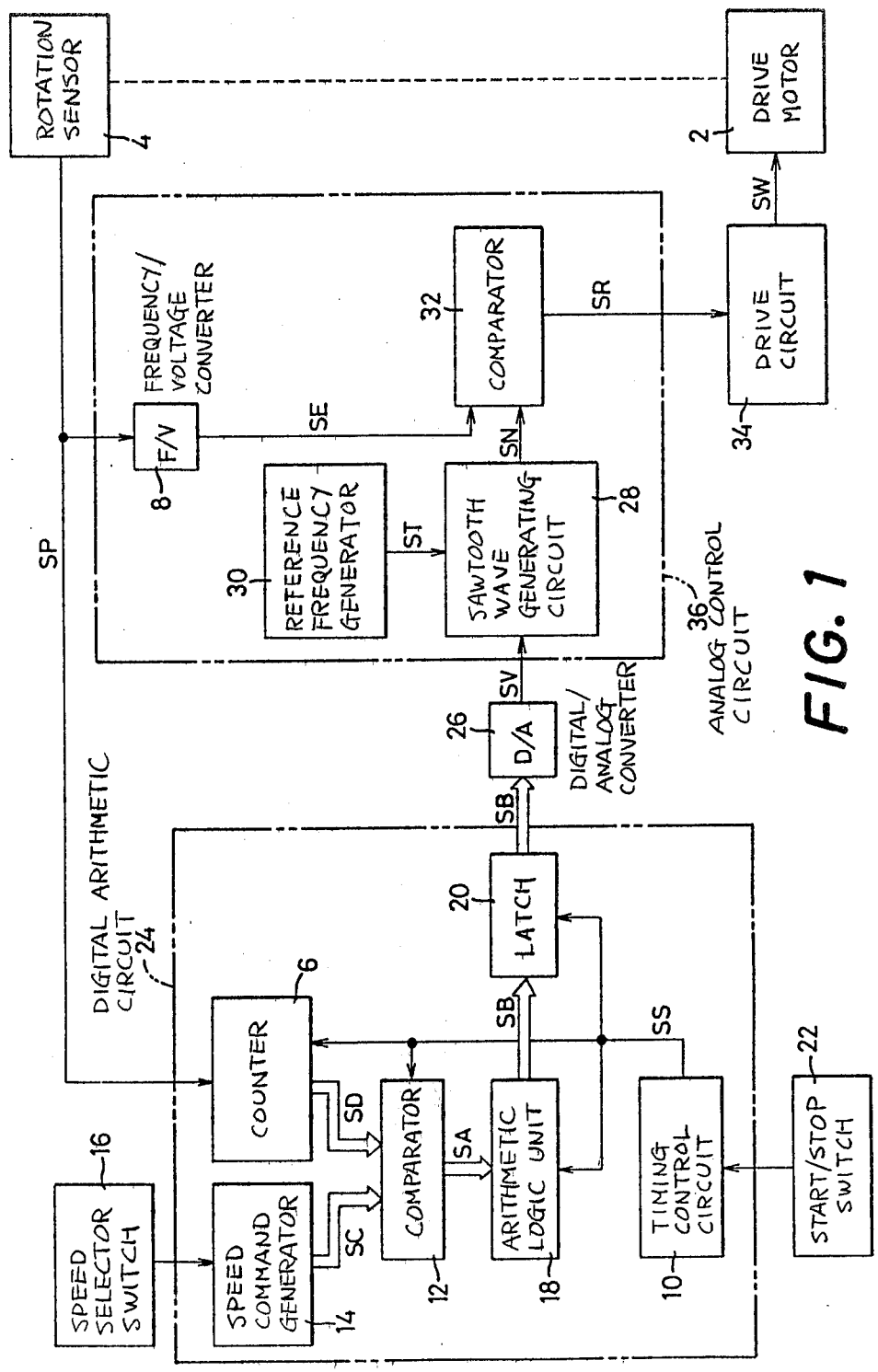
FIG. 1 is a block schematic diagram illustrating the arrangement of a motor speed control system in one form of the invention.

Referring to FIG. 1, numeral 2 designates a dc drive motor of a sewing machine, to the output shaft of which is operatively connected a rotation sensor 4 designed as a pulse generator which produces pulse signals SP having a frequency proportional to detected actual speeds of rotation of the drive motor 2. The pulse signals SP are applied to a counter 6 and to a frequency/voltage converter 8. The rotation sensor 4 usually comprises a rotary disc rotating with the output shaft of the drive motor 2 and having a plurality of slits or teeth which are detected by a photocoupler (optical coupling device) or electromagnetic pick-up device, whereby upon detection of the slits or teeth, the above pulse signals SP are generated from the sensor 4.

The counter 6 serves as counting means which counts the pulse signals SP received in a predetermined time duration, in response to timing instruction signals SS supplied thereto from a timing control circuit 10 in a predetermined time interval or cycle. The counter 6 provides a comparator 12 with digital speed detection signals SD which are code signals representing the count. In more detail, the timing instruction signal SS gives the counter 6 the instructions on preset sampling cycle (approx. 10 milliseconds) and sampling time (approx. 2 milliseconds) of the pulse signal SP, and the digital speed detection signal SD represents the number of the pulse signals SP applied to the counter 6 in the preset length of sampling time, in other words, the actual speed of rotation of the drive motor 2. Accordingly, the rotation sensor 4 and the counter 6 combine to form first detecting means which detects the actual running speed of the drive motor 2 at a predetermined time interval or in a predetermined cycle, and produces the digital speed detection signal SD.

There is connected to the comparator 12 a speed command generator 14 which stores a plurality of code signals SC, i.e., digital speed command signals SC representing desired rotating speeds of the drive motor 2 which are selectable by the operator with a speed selector switch 16. Thus, the digital speed command signal SC representative of the selected speed is transmitted to the comparator 12 upon manipulation of the switch 16.

The comparator 16 compares, in accordance with the timing instruction signals SS, the digital speed detection signal SD and the digital speed command signal SC applied thereto each time the said predetermined sampling time has elapsed, and generates a speed deviation signal SA representing a difference between the detected actual speed and the commanded nominal speed represented by the signals SD and SC, respectively. The generated speed deviation signal SA is supplied to an arithmetic logic unit 18.

The arithmetic logic unit 18 which, like the comparator 12, operates in accordance with the timing instruction signal SS, multiply a value of the speed deviation signal SA by a preset constant K, and add the obtained product to a stored control amount $R_n$ which is a product of the multiplication for the preceding sampling interval (control cycle). Thus, a newly obtained control amount $R_{n+1}$ which is the sum of the $R_n$ and the newly obtained product, is calculated by and stored in the arithmetic logic unit 18, and at the same time applied to a latch 20 in the form of digital control signals SB. Accordingly, the comparator 12 and the arithmetic logic unit 18 constitute in combination arithmetic means which works out the digital control signal SB by solving the following equation (1) based on the digital speed command signal SC representing the selected speed of the drive motor 2 and on the digital speed detection signal SD representing the detected actual speed of the same.

$$R_{n+1}=(Pc-Pd)K+R_n \qquad (1)$$

where, Pc is the selected nominal speed of the drive motor 2 represented by the digital speed command signal SC; Pd is the actual speed of the drive motor 2 represented by the digital speed detection signal SD; and (Pc−Pd) is the difference between the two speeds represented by the speed deviation signal SA. The operation to solve the above equation (1) is adapted to be completed within the remaining length of time (approx. 8 milliseconds) left in the said sampling interval or cycle.

The latch 20 which also operates in accordance with the timing instruction signal SS, holds the digital control signal SB calculated by the arithmetic means for a period of the next sampling interval, and at the same time transmits the signal SB to a digital/analog converter 26 while the signal SB is held in the latch 20. In other words, the latch 20 serves as signal holding means which stores therein the digital control signal SB and whose storage content is updated at the predetermined sampling time interval. It is noted here that the timing control circuit 10 is arranged such that the timing instruction signal SS is generated therefrom so as to enable the digital control signal SB to be latched in and delivered from the latch 20 when a start/stop switch 22 is set by the operator to its start position.

The above described counter 6, speed command generator 14, comparator 12, arithmetic logic unit 18, latch 20 and timing control circuit 10 cooperate to constitute a digital arithmetic circuit 24 capable of processing digital signals, which circuit 24 may be replaced in part or in whole by a so-called "microcomputer". This digital arithmetic circuit 24 and the rotation sensor 4 are employed as a digital control circuit according to the present embodiment of the invention.

The digital/analog converter 26 which is a device for changing digital input signals to analog signals, supplies to a sawtooth wave generating circuit 28 analog control signals SV having voltage values inversely proportional to said control amount represented by the digital control signal SB.

There is coupled to the sawtooth wave generating circuit 28 a reference frequency generator 30 which supplies reference frequency signals ST of higher-than-audio or -sonic frequency (approx. 20 KHz in this embodiment) to the generating circuit 28.

The sawtooth wave generating circuit 28 generates repeatedly a sawtooth wave signal SN whose waveform is characterized by a slope determined by the analog control signal SV and a cycle determined by the reference frequency signal ST. This sawtooth wave signal SN is sent to a comparator 32.

The previously indicated frequency/voltage converter 8 converts the pulse signal SP into an analog speed detection voltage signal SE representative of the actual rotating speed of the drive motor 2, and transmits this voltage signal SE to the comparator 32. Thus, the frequency/voltage converter 8 acts as second detecting means which constantly detects the actual speed of the drive motor.

The comparator 32 compares the sawtooth wave signal SN with the analog speed detection signal SE, and outputs a drive control signal SR to the drive circuit 34. Pulses of this output signal SR of the comparator 32 remain present while the value of the sawtooth wave signal SN is greater than that of the analog speed detection signal SE. The driver circuit 34 includes a power transistor, i.e., semiconductor control element which will conduct as long as the signal SR is present, that is, for a time interval corresponding to the pulse width, and thereore supplies to the drive motor 2 an electric power signal SW which is chopped so as to supply power to the motor 2 at a ratio of pulse width to the interval between the successive pulses of the signal SR (this ratio being generally referred to as duty factor or duty cycle). In summary, the drive current to the drive motor 2 is controlled through the drive circuit 34.

Thus, the frequency/voltage converter 8, reference frequency generator 30, sawtooth wave generating circuit 28 and comparator 32 combine to constitute an analog control circuit 36 which controls the conduction of the drive circuit 34 in response to the analog control signal SV and the analog speed detection signal SE.

Figure 2:
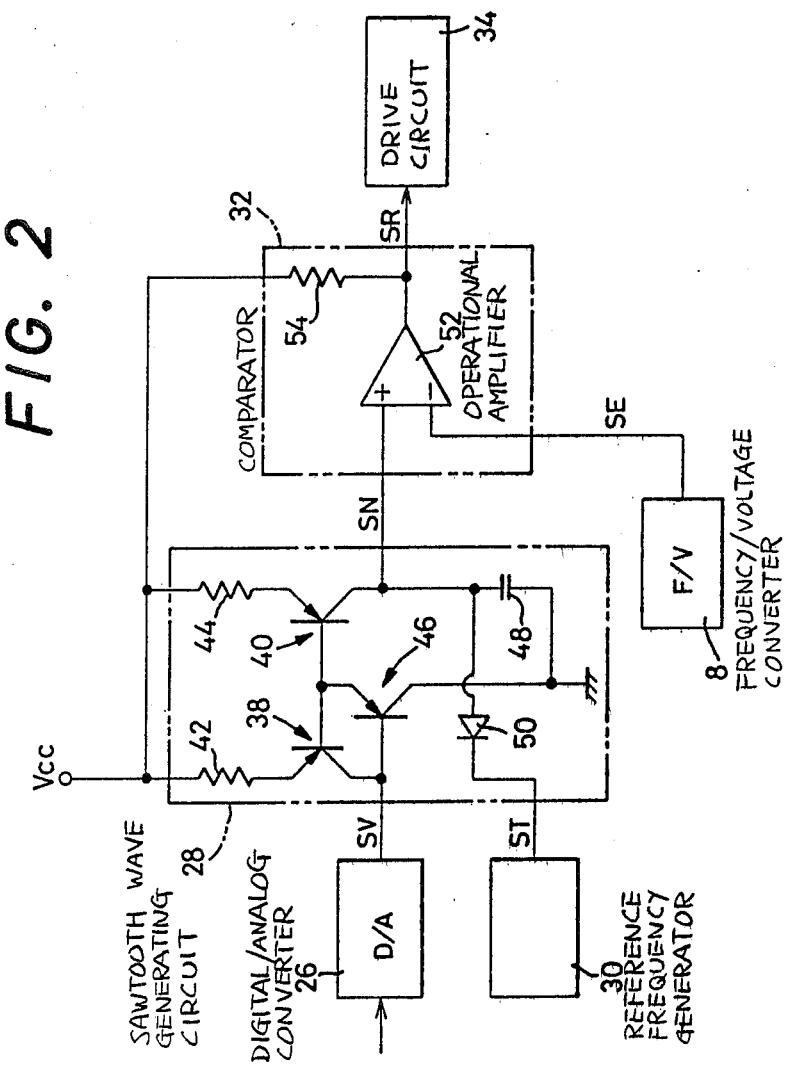
FIG. 2 is a schematic circuit diagram of an essential portion of the system shown in FIG. 1.

The sawtooth wave generating circuit 28 and the comparator 32 may be, for example, a circuit shown in FIG. 2, wherein there are provided PNP-type transistors 38 and 40 whose emitters are connected to a power source Vcc through resistors 42 and 44, respectively, and whose bases are each connected to the ground through an emitter and a collector of a PNP-type transistor 46. An output terminal of the digital/analog converter 26 is coupled to a collector of the transistor 38, and to a base of the transistor 46, and a collector of the transistor 40 is grounded through a capacitor 48 and connected to an output terminal of the reference frequency generator 30 via a diode 50 whose current limiting direction is toward the output of the generator 30. With this arrangement, the base current of the transistors 40 and 46 is determined in accordance with the magnitude of the analog control signal SV supplied to the base of the transistor 46 from the digital/analog convertor 26, whereby the capacitor 48 is charged, through the resistor 44 and the transistor 40, with a current inversely proportional to a voltage level of the analog control signal SV, and the capacitor 48 is discharged through the diode 50 each time the voltage level of the reference frequency signal ST is zeroed. As a result, the charging voltage of the capacitor 48 is varied as indicated by a sawtooth waveform of FIG. 3 which has a linear ramp voltage slope of an angle inversely proportional to the magnitude of the analog control signal SV, and which has a width corresponding to the reference frequency signal ST. This charging voltage is applied to the comparator 32 as the sawtooth wave signal SN.

The comparator 32 comprises an operational amplifier 52 whose output is connected to the power source Vcc through a resistor 54. The operational amplifier 52 generates the drive control signal SR to enable the drive circuit 34 to be activated when the value of the sawtooth wave signal SN applied to a positive (+) input terminal of the amplifier is greater than that of the analog speed detection signal SE applied to a negative (−) input terminal of the same.

There will now be described the operation of the present embodiment of the speed control system.

When the start/stop switch 22 is set to the start position with a power source switch turned on, the amount of power supply to the drive motor 2 is controlled such that the speed difference or deviation represented by the speed deviation signal SA is zeroed whereby the drive motor 2 is driven at a selected desired speed represented by the digital speed command signal SC. More specifically, upon activation of the start/stop switch 22, the commanded or selected speed Pc represented by the digital speed command signal SC is greatly higher than the actual speed of the drive motor 2 represented by the digital speed detection signal SD and consequently the digital control signal SB representing a large control amount $R_{n+1}$ is applied to the digital/analog converter 26 each time the predetermined sampling cycle is repeated. Accordingly, the digital/analog converter 26 supplies to the sawtooth wave generating circuit 28 the analog control signal SV of a low voltage level inversely proportional to the value of the digital control signal SB applied to the input of the converter 26. This results in the sawtooth wave generating circuit 28 generating a sawtooth wave signal SN having a steep slope of ramp voltage as indicated by two-dot broken line in FIGS. 3, which signal SN is supplied to the comparator 32.

In the meantime, the comparator 32 receives the analog speed location signal SE of low voltage level (indicated by broken line in FIG. 3) representative of the actual running speed of the drive motor 2. Therefore, the width of the sawtooth waveform SN at the voltage level of the analog speed detection signal SE is large (the ratio of a portion of the pulse width at which the signal SN value is larger than the signal SE value, is high), and consequently the drive control signal SR of accordingly large pulse width (indicated by two-dot broken line in FIG. 3) is generated by the comparator 32 and transmitted to the drive circuit 34. As a result, the drive circuit 34 supplies to the drive motor 2 the electric power signal SW of high duty factor or cycle, thereby causing the running speed of the motor 2 to rise rapidly.

As the running speed of the drive motor 2 rises, the speed difference represented by the speed deviation signal SA becomes smaller and the slope of the sawtooth waveform SN becomes less steep, and at the same time the voltage level of the analog speed detection signal SE becomes higher, whereby the width of the sawtooth waveform SN at the voltage level of the signal SE becomes smaller and the duty factor of the electric power signal SW to the drive motor 2 becomes lower. When the speed difference represented by the deviation signal SA is zeroed, the speed of rotation of the drive motor 2 is stabilized at the selected or commanded nominal speed represented by the digital speed command signal SC. This condition of the system is indicated by the waveforms of the sawtooth wave signal SN, analog speed detection signal SE and drive control signal SR which are all shown by solid lines in FIG. 3.

It is generally noted here that components of motor speed control systems, particularly analog-signal processing components as compared with digital-signal processing ones, have inherent shortcomings or problems of inconsistent characteristics between the individual systems, and/or drifts in characteristics of each system during service. These problems in the art of the speed control system employing such components necessitated cumbersome adjustment procedures after assembling thereof for adjusting levels of speed command and detection voltages so as to maintain the actual motor speed at a commanded or desired speed. Even with such adjusting procedures, however, there was a potential inconvenience or defect that the running speed of the motor deviates from the nominal speed in the course of service. Thus, the prior art system has suffered a low speed-control accuracy.

In the speed control system according to this embodiment, however, no such problems as stated above are experienced because of the use of digital signals for detecting the actual speed of the drive motor 2 and for calculating an amount of deviation of the detected actual speed from the commanded nominal speed.

Figure 3:
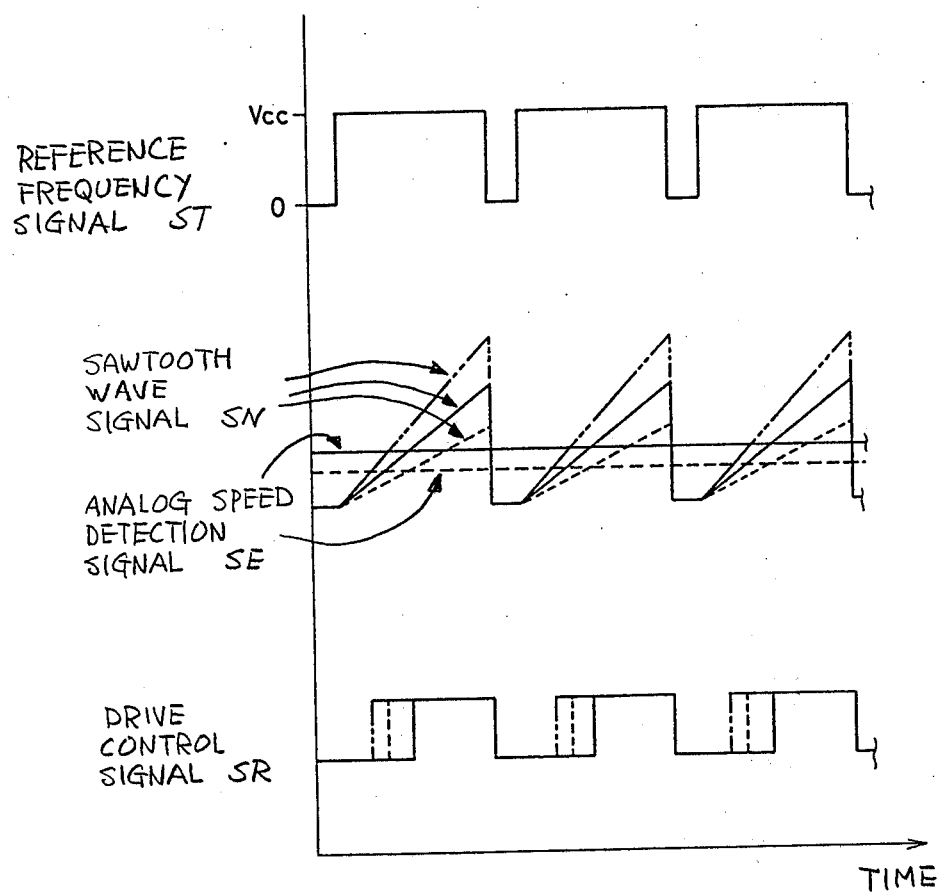
FIG. 3 is a diagram representing waveforms of signals at various points in the system of FIG. 1 to describe the operation thereof.

Assuming, for example, that the voltage level of the analog speed detection signal SE produced by the frequency/voltage converter 8 has fallen, relative to the sawtooth wave signal SN, to a level as shown by the broken line in FIGS. 3 due to variations and/or drifts of the analog control circuit 36, the pulse width of the drive control signal SR is increased as indicated by the broken line in FIG. 3 and the rotating speed of the drive motor 2 is increased accordingly. The increasing actual speed of the motor 2 is detected by the sensor 4 which produces the increasing number of pulse signals SP. The actual speed Pd represented by the digital speed detection signal SD exceeds the commanded speed Pc represented by the digital speed command signal SC whereby the speed difference (Pc−Pd) becomes negative in value. Consequently, the digital control signal SB of a small value is produced by the arithmetic logic unit 18 and transmitted to the digital/analog converter 26 through the latch 20. As a result, the waveform of the sawtooth wave signal SN supplied from the circuit 28 to the comparator 32 will have a reduced slope angle as shown by the broken line in FIG. 3, and the waveform of the drive control signal SR is corrected to have a reduced pulse width as shown by the solid line in FIG. 3. In this manner, the running speed of the drive motor 2 is controlled until the speed deviation represented by the speed deviation signal SA is zeroed, i.e., the motor 2 is controlled so that its rotating speed is stabilized at the selected or commanded nominal speed represented by the digital speed command signal SC, even in the event that the analog speed detection signal SE is adversely changed or affected, for example, by the drift in characteristics of the frequency/voltage converter 8.

Assuming, on the contrary, that the analog speed detection signal SE from the frequency/voltage converter 8 is affected to have an erroneous increase in voltage level due to the drift of the converter 8, the slope angle of the waveform of the sawtooth wave signal SN is increased so as to decrease the speed difference or deviation represented by the speed deviation signal SA to zero, and the waveform of the drive control signal SR is corrected as shown by the solid line in FIG. 3, whereby the running speed of the drive motor 2 is controlled to coincide with the selected nominal speed represented by the digital speed command signal SC. Similarly, any erroneous operation due to variations or drifts of analog-signal processing components other than the frequency/voltage converter 8, e.g., digital/analog converter 26, sawtooth wave generating circuit 28 and comparator 32, will cause the slope angle of the sawtooth wave signal SN to be changed so that the speed difference represented by the speed deviation signal SA is zeroed, i.e., the power supply to the drive motor 2 is controlled by the electric power signal SW so that the motor is driven at the commanded speed.

When the running speed of the drive motor 2 is affected by sudden variations in the load applied to the motor, it is desirable that the electric power signal SW applied to the motor 2 immediately respond to such load variations in order to restore the drive motor to, and then maintain the same at, the commanded speed represented by the digital speed command signal SC. In a speed control system using conventional digital circuits, however, there were limitations in time spent in detecting the motor speed (sampling time) and time in processing the associated digital signals. These time limitations have been a cause for insufficient response capability of such system, that is, the system needs a comparatively long period of time from the occurrence of a motor load variation until the power supply to the motor has been adjusted in response to the load variation. If the sampling time and the digital-signal processing time are, for example, 2 and 8 milliseconds, respectively, that is, if the sampling cycle takes 10 milliseconds (if the time interval between successive control cycles is 10 milliseconds), at least 10 milliseconds may be required before the motor subject to a load variation is provided with the power supply signal adapted to such load variation.

In the present speed control system of the invention, a change in the running speed of the drive motor 2 due to a sudden variation in the load applied thereto is detected by the rotation sensor 4, and upon detection of such change, the pulse signal SP produced from the sensor 4 is immediately converted into the analog speed detection signal SE by the frequency/voltage converter 8. This analog signal SE representative of the speed changed due to the load variation is compared in the comparator 32 with the sawtooth wave signal SN and the drive control signal SR adapted to the load variation is immediately supplied to the drive circuit 34, whereby the drive motor 2 is restored to the commanded nominal speed. Assuming, for example, that the rotating speed of the drive motor 2 has been reduced due to a sudden change in the load, the voltage level of the analog speed detection signal SE falls down to the level shown by the broken line in FIG. 3 and the pulse width of the drive control signal SR generated from the comparator 32 is increased as indicated by the broken line in the same figure. Consequently, the amount of power supplied to the drive motor 2 is immediately increased, thereby enabling the drive motor 2 to revert to its originally selected nominal speed in a short length of time. In summary, the speed control system of this invention is capable of responding extremely fast to the variations in the load applied to the drive motor 2, irrespective of a sampling cycle of the counter 6.

As described above, the present embodiment of a speed control system according to the invention is characterized in that the detection of an actual speed of the drive motor 2, and the calculation of a speed difference of said actual speed from a commanded speed, are conducted by a digital control assembly consisting of the rotation sensor 4 and the digital arithmetic circuit 24. This characteristic of the control system eliminates the conventional need for cumbersome adjustments of the system after assembling thereof, and the problem of low controlling accuracy due to unfavourable variations in the running speed of the drive motor 2 during its service. In addition, the present control system has an extremely high response capability, that is, the electric power signal SW for power supply to the motor 2 is quickly adaptable, by means of the analog control circuit 36, to varying loads applied to the motor, without regard to the time necessary for detecting the actual motor speed and for processing the digital signals used in the control system.

Although the invention has been described in its preferred embodiment with reference to the drawings, it may be embodied in other forms.

For example, the control system of this invention which is particularly used to control a dc drive motor of a sewing machine as in the above embodiment, may be applied to control the speeds of motors used in other instruments or machines. Such motors to be controlled by the present control system may either dc motors which are driven with a power supply continuously controlled through a power transistor, or universal motors which are operated under the control of semiconductor power supply control elements such as a thyristor and a triac (triode ac semiconductor switch).

As another example, the frequency/voltage converter 8 which, in the previous embodiment, is used as detecting means for converting the pulse signal SP into the analog speed detection signal SE, may be replaced by a tachometer generator which is operatively coupled to the output shaft of the drive motor 2 to produce voltage signals corresponding to detected speeds of rotation of the output shaft.

It is to be understood that the form of the invention herein shown and described is to be taken as a preferred example of the same and that various changes and modifications may be made without departing from the spirit of the invention or the scope of the appended claims.

What is claimed is:

1. A motor speed control system for controlling the drive current to a motor through a semiconductor element in response to a drive control signal applied to said element, comprising:

a digital control circuit including first detecting means for detecting the actual speed of said motor at a predetermined time interval and generating a digital speed detection signal representative of the detected actual speed, speed commanding means for generating a digital speed command signal corresponding to a predetermined speed of said motor, means for preparing a digital control signal based on a difference between said digital speed detection signal and said digital speed command signal, and latch means for storing said digital control signal in a timed relation with the detection of said actual speed, a converter for generating an analog control signal corresponding to the digital control signal stored in said latch means, and an analog control circuit including second detecting means for constantly detecting the actual speed of said motor and generating an analog speed detection signal representative of the detected actual speed, said analog circuit generating said drive control signal in response to said analog control signal and said analog speed detection signal.

2. A motor speed control system as set forth in claim 1, wherein said analog control circuit further includes a sawtooth wave generating circuit generating repeatedly a sawtooth wave signal at a time interval substantially shorter than said predetermined time interval and a comparator supplying said semiconductor element with a drive control signal according to the result of comparison between said analog speed detection signal and said sawtooth wave signal, and said sawtooth wave generating circuit is adapted to vary the slope of said sawtooth wave signal according to the magnitude of said analog control signal.

* * * * *